United States Patent [19]

Steer

[11] Patent Number: 4,474,005
[45] Date of Patent: Oct. 2, 1984

[54] MASTER CYLINDER

[75] Inventor: John E. Steer, South Bend, Ind.

[73] Assignee: The Bendix Corporation, Southfield, Mich.

[21] Appl. No.: 411,724

[22] Filed: Aug. 26, 1982

[51] Int. Cl.³ .......................................... B60T 11/20
[52] U.S. Cl. ...................................... 60/562; 60/585; 60/589; 60/592
[58] Field of Search ................ 60/562, 585, 589, 592; 92/170, 171

[56] References Cited

U.S. PATENT DOCUMENTS

| 3,156,097 | 11/1964 | Brown | 60/588 |
| 4,050,359 | 9/1977 | Mayer | 92/171 |
| 4,249,381 | 2/1981 | Gaiser | 60/562 |

FOREIGN PATENT DOCUMENTS 0067100 12/1982 European Pat. Off. .............. 60/562

Primary Examiner—Robert E. Garrett
Assistant Examiner—Scott L. Moritz
Attorney, Agent, or Firm—Paul D. Schoenle; Ken C. Decker

[57] ABSTRACT

A master cylinder includes a housing (12) with a bore (14) receiving a pair of pistons (32, 34). A bearing (50) extends from the housing (12) to one of the pistons (32) to define a passage (65) communicating fluid to a pressure chamber (40). The bearing (50), the passage (65) and the pressure chamber (40) extend outwardly of the housing bore (14) to permit the length of the housing to be reduced.

16 Claims, 1 Drawing Figure

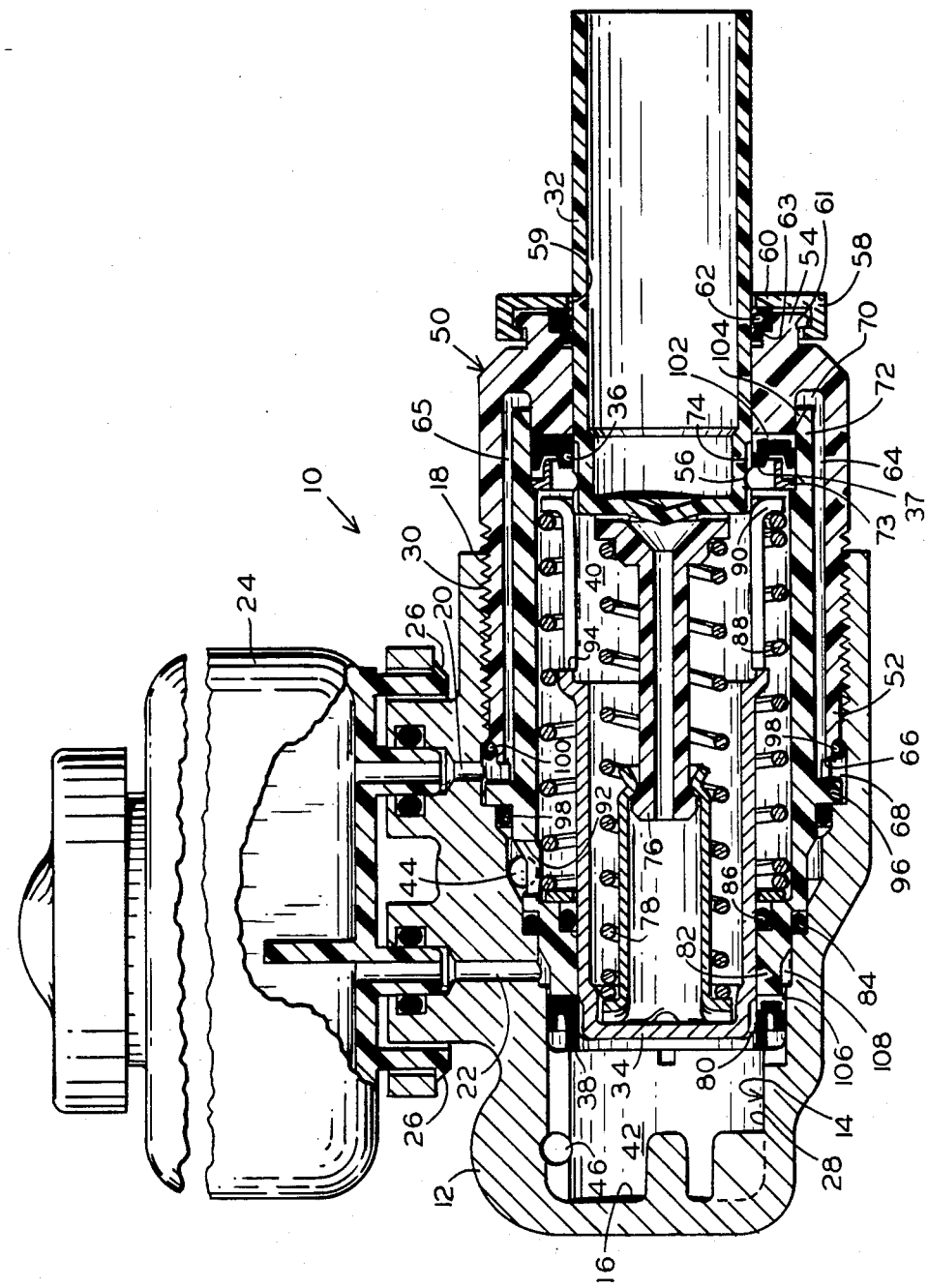

MASTER CYLINDER

The present invention relates to a master cylinder wherein a pair of pistons are movable within a housing bore to develop fluid pressure within a pair of pressure chambers.

A master cylinder comprising a housing with a bore extending axially therein for receiving fluid from a reservoir, a pair of pistons movably disposed within the bore to develop fluid pressure in a pair of pressure chambers during braking and a bearing extending between the housing and one of the pair of pistons to substantially enclose an open end of the bore, and said bearing including a first end secured to said housing and a second end engaging said one piston remote from said housing.

In U.S. Pat. No. 4,249,381, a master cylinder displaces fluid from a housing by moving a pair of pistons relative to a pair of fixed sealing members to generate fluid pressure during braking. A housing bore is provided to receive the pair of pistons, a sleeve co-operating with the sealing members and a bearing supporting one of the pistons and retaining the sleeve in a fixed position within the bore. The housing length extends over substantially the entire length for the parts received within the bore. In addition, the housing bore includes a substantial length exposed to the fluid pressure developed in one of the pair of pressure chambers. As an improvement for the above-described master cylinder, it is desireable to provide a shorter length for the housing to reduce the weight and size of the master cylinder and also to provide a shorter length for that portion of the housing bore exposed to fluid pressure in the one pressure chamber so that the area for potential leakage is reduced.

The present invention is characterized in that said bearing further defines a passage between said first and second ends to provide for fluid communication between said reservoir and one of said pair of pressure chambers substantially independently of said housing bore whereby a compact arrangement for said housing is provided.

It is an advantage of the present invention that by using the bearing as a boundary for the one pressure chamber outside of the housing a shorter housing can be provided.

A further advantage results from the bearing sealingly engaging the housing bore to provide a small area for the latter which is exposed to the fluid pressure developed in the one pressure chamber.

The invention will now be described with reference to the accompanying drawing which illustrates one way of carrying out the invention.

In the sole FIGURE a master cylinder 10 includes a housing 12 with a bore 14 therein extending from a bottom wall 16 to an open end 18. A pair of openings 20 and 22 intersect the bore 14 to provide fluid communication from a reservoir 24 to the bore 14. The reservoir is illustrated as a plastic material with tabs 26 providing for attachment of the reservoir 24 to the housing 12; however; the invention herein is equally applicable to an integrally formed reservoir with the housing.

The bore 14 is stepped with a plurality of diameter sections between a small section 28 adjacent the bottom wall 16 and a large threaded section 30 adjacent the open end 18. A pair of pistons 32 and 34 are movable within the bore 14 during braking. The piston 32 extends outwardly from the open end 18 to cooperate with an input device (not shown) and the piston 34 is enclosed within the bore 14. A pair of sealing rings 36 and 38 cooperate with the pair of pistons 32 and 34, respectively, such that the pistons are movable relative to the fixed sealing rings to develop fluid pressure within a pair of pressure chambers 40 and 42. The pressure chambers 40 and 42 communicate with outlet ports 44 and 46 as described hereinafter to communicate fluid pressure to associated brake circuits (not shown).

A bearing 50 includes a first end 52 threadably secured to the threaded diameter section 30 and a second end 54 engaging the piston 32 to support the latter. The second end is formed with a smaller radius than the first end so that a radially inwardly extending portion engages the piston 32 and also opposes the sealing ring 36. The piston 32 is provided with a notch 56 and the sealing ring 36 includes a radially inner lip 37 which is capable of extending into the notch 56 in order to lightly retain the piston 32 in attachment with the bearing 50 before the master cylinder is installed in a vehicle. During installation the piston 32 is moved inwardly so that the lip 37 is removed from the notch. The bearing defines a plurality of axially extending grooves 64 extending from the forward end of the bearing at the first end 52 to the second end 54. The grooves 64 align with slots 66 at the forward end to communicate the grooves 64 with the reservoir 24 via the opening 20 and an intermediate circumferential spacing 68 between the forward end and the bore 14. The second end 54 defines a recess or undercut 70 to receive a sleeve 72 and the forward end of the bearing abuts the sleeve to retain the latter fixedly disposed within the bore 14. The sleeve 72 cooperates with the bearing 50 via grooves 64 to define a passage 65 extending from the end 52 to the end 54 and communicating the reservoir 24 with the pressure chamber 40 past the sealing ring via notches 74 provided on the forward end of the piston 32.

A sealing assembly 58 is carried at the end 54 of bearing 50. The sealing assembly 58 comprises a collar 60 and a seal 62. The seal fits within a groove 63 at the right end of the bearing 50 and the collar 60 is carried within a recess 61 such that an inner edge 59 of the collar retains the seal within the groove.

A two-part spring set 76 extends between the pistons 32 and 34 to carry a spring 78. The piston 34 includes notches 80 on its forward end to permit direct fluid communication between the pressure chamber 42 and the reservoir via opening 22 when the piston 34 is in its rest position. The sleeve includes an integral support 82 which sealingly engages the bore via seal 84 and the piston 34 via seal 86 to seal the pressure chamber 40 from the pressure chamber 42. The support 82 also centers the piston 34 within the bore 14 to permit movement of the piston 34 past the seal 38. A spring 88 extending between the trailing end 90 of the piston 34 and the support 82 maintains the latter in its fixed position within the bore 14.

The forward end of the sleeve 72 is slotted to define apertures 92 and the piston 34 is slotted to define apertures 94 so that fluid within chamber 40 can be displaced during braking to the outlet port 44. The forward end of the sleeve 72 opposes the seal 84 to fixedly retain the latter within the bore 14 adjacent one side of outlet port 44 and the sleeve forms a shoulder 96 opposing a seal 98 to fixedly retain the latter within the bore 14 adjacent the other side of outlet port 44. The seal 98 also cooperates with a seal 100 to sealingly communicate the opening 20 with the passage 65. The trailing end of the sleeve carries a retainer 73 cooperating with the second end of the bearing to define a fixed position for the sealing ring 36.

When the pair of pistons 32 and 34 are in the rest position shown, the pair of pressure chambers 40 and 42 are in fluid communication with the reservoir 24. The chamber 40 communicates with the reservoir via the notch 74, a seal groove 102, a relief 104 between the sleeve and bearing leading to a clearance between the latter, the recess 70, the passage 65, the slot 66 and the circumferential spacing 68, and the opening 20. The chamber 42 communicates with the reservoir via the notch 80, a seal groove 106 and a circumferential spacing 108 leading to the opening 22. During braking, the piston 32 is moved to close communication between the notch 74 and the seal groove 102 so that fluid trapped in the chamber 40 is contracted in volume to develop fluid pressure therein. At substantially the same time, the piston 34 is moved to contract spring 88, in response to the fluid pressure build up in chamber 40 as well as the force of spring 78 which is being contracted in order to close communication between the notch 80 and the seal groove 106. Consequently, fluid trapped in chamber 42 is also contracted in volume to develop fluid pressure therein. Upon termination of braking, the springs 78 and 88 are resiliently biased to expand to the rest position shown so that the pistons are returned to their rest position.

With the bearing 50 and the sleeve 72 extending outwardly from the open end 18, it is possible to form a portion of the chamber 40 outside the housing, which, in turn, is rendered substantially shorter than the prior art. Not only are the bearing and sleeve partly disposed axially outside the housing bore, but the piston 32 is completely outside the housing bore in its rest position together with the sealing ring 36, and the piston 34 is also partly disposed axially outside the housing bore 14 in its rest position.

As shown, the sleeve 72 positions the seals 84 and 98 relatively close to each other in reference to the total axial length of the housing bore. The spacing between the seals defines a small distance which is the only portion of the housing bore exposed to fluid pressure developed in the chamber 40. Consequently, the housing bore to the right of seal 98 will experience no pressure build up so that any weakness in the housing to the right of seal 98 will not be exploited by fluid pressure in an attempt to leak the latter out of the master cylinder housing.

I claim:

1. A master cylinder comprising a housing with a bore extending axially therein for receiving fluid from a reservoir, a pair of pistons movably disposed within the bore to develop fluid pressure in a pair of pressure chambers during braking and a bearing extending between the housing and one of the pair of pistons to substantially enclose an open end of the bore, and said bearing including a first end secured to said housing and a second end engaging said one piston remote from said housing, characterized in that said bearing further defines a passage between said first and second ends to provide for fluid communication between said reservoir and one of said pair of pressure chambers substantially independently of said housing bore whereby a compact arrangement for said housing is provided, said bearing opposing a sealing ring engageable with said one piston and said sealing ring being fixedly disposed relative to said bearing at an axial position outside said housing bore.

2. The master cylinder of claim 1 in which said bearing defines at least one axially extending groove between said first and second ends in order to substantially form said passage.

3. The master cylinder of claim 1 in which said housing bore receives a sleeve extending into said bearing between said first and second ends and said sleeve cooperates with said bearing to form said passage.

4. The master cylinder of claim 3 in which said second end defines a radially inwardly extending portion of smaller radius than said first end and said portion defines a recess receiving said sleeve.

5. The master cylinder of claim 4 in which said recess forms a portion of said passage extending from said reservoir to said one pressure chamber.

6. The master cylinder in claim 1 in which said second end defines a radially inwardly extending portion of smaller radius than said first end and said portion opposes a sealing ring cooperating with said one piston.

7. A master cylinder comprising a housing with a bore extending radially therein for receiving fluid from a reservoir, a pair of pistons movably disposed within the bore to develop fluid pressure in a pair of pressure chambers during braking and a bearing extending between the housing and one of the pair of pistons to substantially enclose an open end of the bore, said bearing including a first end secured to said housing and a second end engaging said one piston remote from said housing, said bearing further defining a passage between said first and second ends to provide for fluid communication between said reservoir and one of said pair of pressure chambers substantially independently of said housing bore whereby a compact arrangement for said housing is provided, said housing includes a first opening providing for fluid communication between said reservoir and said one pressure chamber, a second opening providing for fluid communication between said reservoir and said other pressure chamber, and said first and second openings define an axial length therebetween which is less than an axial length for said other piston.

8. The master cylinder of claim 1 in which said one piston is disposed axially outside said housing bore when said pair of pistons are in a rest position.

9. The master cylinder of claim 1 in which said other piston includes an end disposed axially outside said housing bore when said other piston is in a rest position.

10. The master cylinder of claim 1 in which both said pair of pistons include portions disposed axially outside of said housing bore when both said pair of pistons are in a rest position.

11. A master cylinder comprising a housing with a bore extending axially therein for receiving fluid from a reservoir, a pair of pistons movably disposed within the bore to develop fluid pressure in a pair of pressure chambers during braking and a bearing extending between the housing and one of the pair of pistons to substantially enclose an open end of the bore, said bearing including a first end secured to said housing and a second end engaging said one piston remote from said housing, said bearing further defining a passage between said first and second ends to provide for fluid communication between said reservoir and one of said pair of pressure chambers substantially independently of said housing bore whereby a compact arrangement for said housing is provided, and said bearing includes latching means releasably opposing withdrawal of said one piston from said bearing while also permitting insertion of said one piston into said bearing after the latter is secured to said housing.

12. The master cylinder of claim 1 in which said bearing defines a bore for receiving said one piston and a sleeve is received within said bearing bore to cooperate therewith in order to substantially define said passage.

13. A master cylinder comprising a housing with a bore extending axially therein for receiving fluid from a reservoir, a pair of pistons movably disposed within the bore to develop fluid pressure in a pair of pressure chambers during braking and a bearing extending between the housing and one of the pair of pistons to substantially enclose an open end of the bore, said bearing including a first end secured to said housing and a second engaging said one piston remote from said housing, said bearing further defines a passage between said first and second ends to provide for fluid communication between said reservoir and one of said pair of pressure chambers substantially independently of said housing bore whereby a compact arrangement for said housing is provided, a sleeve cooperating with said bearing to substantially define said passage and said sleeve defining fixed positions for a pair of seals, said pair of seals defining an axial length therebetween of small dimension relative to the axial length of said housing bore and said small dimension axial length forming the only section of said housing bore being exposed to the fluid pressure developed in said one pressure chamber.

14. The master cylinder of claim 13 in which said small dimension axial length is about one-fifth the length of said housing bore.

15. A master cylinder comprising a housing with a bore therein, a pair of openings communicating fluid from a reservoir to the housing bore, a pair of pistons movably disposed within the bore in order to generate fluid pressure within a pair of pressure chambers within the bore during braking, and bearing means extending into the housing bore, the bearing means defining a fluid passage communicating the reservoir with one of the pair of pressure chambers, the bearing means extending axially over a substantial length of the one pressure chamber to reduce that portion of the housing bore exposed to the fluid pressure developed in the one pressure chamber during braking, the bearing means substantially defining fixed positions for a pair of seals engaging the housing bore at spaced axial positions and the axial distance between the fixed positions is small in relation to the axial distance of the housing bore in order to minimize the distance of the housing bore exposed to fluid pressure developed in the one pressure chamber.

16. The master cylinder of claim 15 in which the bearing means forms a boundary for the one pressure chamber and the boundary extends outside of the housing bore so that the length of the housing can be shorter than the combined lengths of the pair of pressure chambers.

* * * * *